(12) United States Patent
Liang et al.

(10) Patent No.: US 12,053,789 B2
(45) Date of Patent: Aug. 6, 2024

(54) FOOD PUMP WITH SAFE OUTLET VALVE AND OUTER MOUNTED SPRING

(71) Applicant: MAJESTY PACKAGING SYSTEMS LIMITED, Guangdong (CN)

(72) Inventors: Peihui Liang, Guangdong (CN); Maoyong Zhu, Guangdong (CN); Yonglei Zhang, Guangdong (CN); Jinkao Liang, Guangdong (CN)

(73) Assignee: MAJESTY HOLDINGS CO., LTD., Guangdong (CN)

( * ) Notice: Subject to any disclaimer, the term of this patent is extended or adjusted under 35 U.S.C. 154(b) by 0 days.

(21) Appl. No.: 17/905,371

(22) PCT Filed: Nov. 23, 2020

(86) PCT No.: PCT/CN2020/130795
§ 371 (c)(1),
(2) Date: Aug. 31, 2022

(87) PCT Pub. No.: WO2022/052317
PCT Pub. Date: Mar. 17, 2022

(65) Prior Publication Data
US 2023/0211365 A1    Jul. 6, 2023

(30) Foreign Application Priority Data

Sep. 11, 2020  (CN) .......................... 202021995537.3

(51) Int. Cl.
*B05B 11/10* (2023.01)
(52) U.S. Cl.
CPC .......... *B05B 11/106* (2023.01); *B05B 11/104* (2023.01); *B05B 11/1047* (2023.01); *B05B 11/1067* (2023.01); *B05B 11/1074* (2023.01)

(58) Field of Classification Search
CPC . B05B 11/106; B05B 11/104; B05B 11/1047; B05B 11/1067; B05B 11/1074;
(Continued)

(56) References Cited

U.S. PATENT DOCUMENTS 4,991,746 A * 2/1991 Schultz ............... B05B 11/1023
222/321.3
5,725,128 A * 3/1998 Foster ................. B05B 11/1023
222/321.9
(Continued)

FOREIGN PATENT DOCUMENTS

CN          1219916 A    6/1999
CN       204137527 U    2/2015
(Continued)

*Primary Examiner* — Bob Zadeh
(74) *Attorney, Agent, or Firm* — Bochner PLLC; Andrew D. Bochner

(57) ABSTRACT

A food pump is provided with a safe outlet valve and an outer mounted spring. A pressing head, a primary column, a secondary column, a piston, a pump chamber, a spring and a bottle locking cover are also provided. A lock cover for fixing the primary column to the pump chamber is fixed on the pump chamber. An outer side of an upper end of the lock cover is provided with a cover flanging which is turned outwards and then turned downwards to stretch. An inner side of a locking flanging is provided with an inner thread in threaded fit with an outer thread of a lock opening of a lock cover, such that the primary column, the secondary column, the piston, the pump chamber, the spring, a glass bead and the lock cover can be stored and transported independently, thereby matching different pressing heads and bottle locking covers.

10 Claims, 5 Drawing Sheets

(58) Field of Classification Search
CPC ............... B05B 11/007; B05B 11/1023; B05B 11/0032; F16K 15/147
See application file for complete search history.

(56) References Cited

U.S. PATENT DOCUMENTS

| | | | |
|---|---|---|---|
| 11,415,120 B2* | 8/2022 | Liang | B05B 11/1023 |
| 2004/0084481 A1* | 5/2004 | Foster | B05B 7/0031 |
| | | | 222/321.9 |
| 2007/0045349 A1* | 3/2007 | Foster | B05B 11/106 |
| | | | 222/321.9 |
| 2010/0219209 A1* | 9/2010 | Ding | B05B 11/1001 |
| | | | 222/321.9 |
| 2017/0128967 A1* | 5/2017 | Law | B05B 11/1047 |
| 2019/0118205 A1* | 4/2019 | Knight | B05B 11/1047 |
| 2023/0211365 A1* | 7/2023 | Liang | B05B 11/106 |
| | | | 222/401 |

FOREIGN PATENT DOCUMENTS

| | | |
|---|---|---|
| CN | 104724378 A | 6/2015 |
| CN | 105800071 A | 7/2016 |
| CN | 206704853 U | 12/2017 |
| CN | 208897686 U | 5/2019 |
| CN | 110547582 A | 12/2019 |
| CN | 111332599 A | 6/2020 |
| CN | 112110030 A | 12/2020 |
| JP | 2020083327 A | 6/2020 |
| WO | WO-2017198616 A1 * 11/2017 ......... B05B 11/1047 |

\* cited by examiner

FOOD PUMP WITH SAFE OUTLET VALVE AND OUTER MOUNTED SPRING

CROSS-REFERENCE TO RELATED APPLICATIONS

The present application is a National Stage application of PCT international application PCT/CN2020/130795, filed on Nov. 23, 2020, which claims priority to a Chinese Patent Application No. 202021995537.3, filed with the China National Intellectual Property Administration on Sep. 11, 2020 and entitled "FOOD PUMP WITH SAFE OUTLET VALVE AND OUTER MOUNTED SPRING", both of which are incorporated herein by reference in their entireties.

TECHNICAL FIELD

The utility model relates to a food pump with a safe outlet valve and an outer mounted spring.

BACKGROUND

Food safety is getting more and more attention. After starting to use, a conventional food pump has a normally-open outlet, and an inner side of the pump communicates with an outer side thereof through the outlet. Due to the attraction of food, it is easy to attract mosquitoes, worms and the like to enter and then contaminate the material, and dust and impurities in the air will also contaminate the material.

In addition, existing food pumps mostly adopt the structural design of a built-in spring, in which the metal spring directly contacts the material, which is easy to corrode the metal spring and is not environmentally friendly. Moreover, food pumps are generally of an integrated structure, that is to say, a pump core, a bottle locking cover and a pressing head are assembled and fixed. During assembly, the bottle locking cover is fixed onto the pump core through an outer lock cover and an inner lock cover or the like, such that it is not flexible enough to use.

The utility model has been made in light of this situation.

SUMMARY

The utility model aims to overcome the shortcomings of the prior art and provide a food pump with a safe outlet valve and an outer mounted spring, which has characteristics of simple structure, safety sanitation, and flexible use.

The utility model is realized by the following technical solutions.

A food pump with a safe outlet valve and an outer mounted spring, comprising a pressing head, a primary column, a secondary column, a piston, a pump chamber, a spring and a bottle locking cover. The pressing head is installed on the primary column. The primary column is arranged within the pump chamber. The secondary column is connected to a lower end of the primary column. The piston is sleeved on outer sides of the primary column and the secondary column. A lock cover capable of fixing the primary column to the pump chamber is fixed on the pump chamber. An outer side of an upper end of the lock cover is provided with a cover flanging which is turned outwards and then turned downwards to stretch. An upper end of the pump chamber is inserted into and fixed onto an inner side of the cover flanging. The lock cover is provided with a locking opening protruding upwards above the cover flanging. An outer side of the locking opening is provided with an outer thread. An upper end of the primary column is provided with a locking flanging which is turned outwards and then turned downwards to stretch in order to be sleeved on an outer side of the locking opening. An inner side of the locking flanging is provided with an inner thread that is in threaded fit with the outer thread.

According to the food pump with a safe outlet valve and an outer mounted spring as described above, the locking flanging has an outer diameter smaller than an outer diameter of the cover flanging; a top plate of the bottle locking cover is provided with a top hole which has a hole diameter smaller than the outer diameter of the cover flanging and through which the cover flanging can pass under the action of an external force; an upper part of the pump chamber is provided with an annular baffle which can be blocked beneath the top plate of the bottle locking cover from below and restricts the top plate of the bottle locking cover below the cover flanging; a gasket located below the baffle is provided between the pump chamber and the bottle locking cover.

According to the food pump with a safe outlet valve and an outer mounted spring as described above, the bottle locking cover is provided with an outward-facing chamfer on a lower edge of the top hole.

According to the food pump with a safe outlet valve and an outer mounted spring as described above, an inner side wall of the cover flanging is provided with a concave annular groove; the upper end of the pump chamber is provided with a convex ring which protrudes outwards and is tightly attached to the annular groove; and there are two pairs, including an upper pair and a lower pair, of the convex rings and the annular grooves.

According to the food pump with a safe outlet valve and an outer mounted spring as described above, the lock cover is provided with a spring cavity inserted into the pump chamber; an outer side of the primary column is provided with an outer sleeve located in the spring cavity; the spring is arranged inside the outer sleeve, and an upper end of the spring is pressed against the top of the outer sleeve while a lower end thereof is pressed against the bottom of the spring cavity; the primary column protrudes downwards from the bottom of the spring cavity; the secondary column and the piston are located below the spring cavity; the spring is positioned above and isolated from a material cavity so as to avoid a contact between the spring and a material when the food material is pumped.

According to the food pump with a safe outlet valve and an outer mounted spring as described above, the secondary column is fixed on the lower end of the primary column; a through hole for liquid to flow into the primary column is reserved between the secondary column and the primary column; the lower end of the primary column is inserted into an inner ring of the piston; the inner ring of the piston is provided with an annular sealing ridge which protrudes inwards and tightly presses against the outer side of the primary column from the side; a step for the primary column to press against after moving downwards a certain distance relative to the piston is provided at a certain distance below the annular sealing ridge.

According to the food pump with a safe outlet valve and an outer mounted spring as described above, an outflow head with an outlet facing downwards is connected at an outlet of the pressing head, and the outlet of the outflow head is provided with a closing valve which can close the outlet.

According to the food pump with a safe outlet valve and an outer mounted spring as described above, the closing valve comprises a cover cap which is connected to the outflow head through a flexible strip and can cover the outlet of the outflow head.

According to the food pump with a safe outlet valve and an outer mounted spring as described above, the closing valve comprises an elastic duckbill head; the closing valve is connected with a fixing sleeve for fixing the duckbill head below the outlet of the outflow head; the duckbill head is located inside the fixing sleeve, and has a flat mouth which elastically opens when pressure inside the pressing head increases and elastically returns to close under its own elasticity when the pressure inside the pressing head decreases.

According to the food pump with a safe outlet valve and an outer mounted spring as described above, the pressing head is provided with a socket, and an inner side of the primary column is provided with a plug inserted into the socket for plug-in fixation.

Compared with the prior art, the utility model has the following advantages.

1. In the utility model, a pump core is composed of a primary column, a secondary column, a piston, a pump chamber, a spring, a glass bead and a lock cover. The lock cover is fixed on the pump chamber by inserting and fixing an upper end of the pump chamber into the cover flanging. The primary column is fixed to the lock cover by a threaded connection of the locking flanging and the locking opening. Meanwhile, the secondary column, the piston, the spring and the glass bead are confined within the pump chamber, thus forming a pump core which can be stored and transported independently, so that the pump core, as a standard component, can match different pressing heads and bottle locking covers according to requirements in subsequent production and assembly processes, so as to meet the needs of different customers and use occasions, increase the flexibility of use, and reduce product development and manufacturing cost.

2. By providing an outer thread on an outer side of the locking opening and providing an internal thread inside the locking flanging, and by rotating the primary column to enable the internal thread to be screwed onto the outer thread, the utility model is simple in structure, stable and reliable in locking, can effectively prevent loosening caused by vibration, and is beneficial to back-end transportation and assembly production.

3. In the utility model, the spring is externally disposed to avoid contact between the spring and the material at the time of pumping the food material, which can prevent the spring from corroding and contaminating the material, which is unsanitary.

4. In the utility model, an outflow head with an outlet facing downwards is connected at an outlet of the pressing head, and the outlet of the outflow head is provided with a closing valve which can close the outlet, which can effectively prevent mosquitoes, worms, dust and impurities in the air, etc. from entering and then contaminating the material.

5. In the utility model, a duckbill head is fixed below the outlet of the outflow head, and the duckbill head has an elastically closed flat mouth. When the pressing head is pressed, the food material flows out by breaking through the flat mouth due to its large internal pressure; after the pressing head bounces up, the internal pressure experienced by the flat mouth becomes smaller, and the flat mouth can be closed elastically, thereby realizing automatic opening and closing of the outlet of the pressing head.

BRIEF DESCRIPTION OF THE DRAWINGS

The specific implementations of the utility model will be further explained in detail with reference to the accompanying drawings, in which.

DETAILED DESCRIPTION

Figure 1:
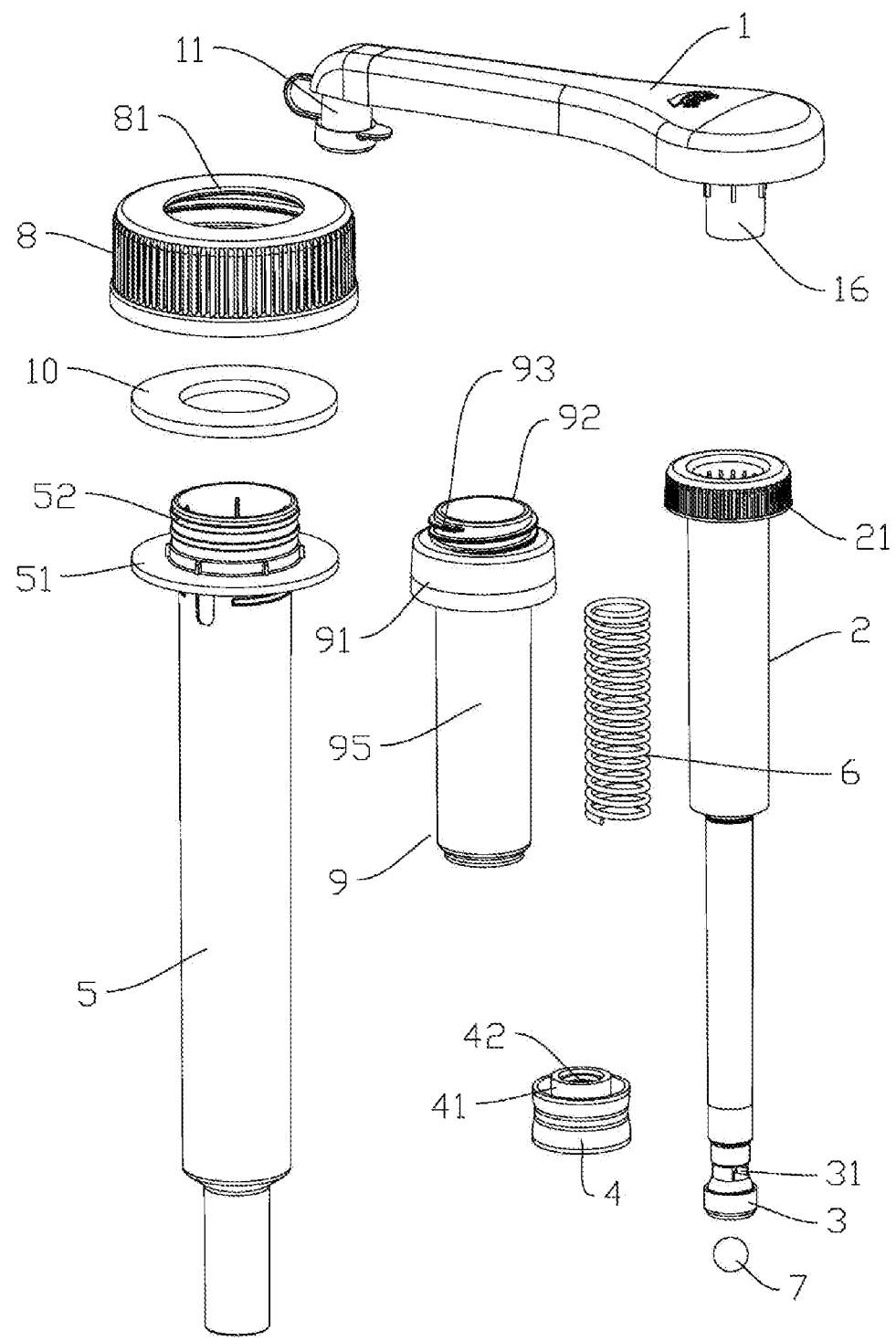
FIG. 1 is an explosion view of an embodiment of a food pump with a safe outlet valve and an outer mounted spring of the utility model.

The utility model is further described below with reference to the accompanying drawings.

As shown in FIGS. 1 to 6, a food pump with a safe outlet valve and an outer mounted spring comprises a pressing head 1, a primary column 2, a secondary column 3, a piston 4, a pump chamber 5, a spring 6, a glass bead 7 and a bottle locking cover 8. The pressing head 1 is installed on the primary column 2, and the primary column 2 is arranged in the pump chamber 5. The secondary column 3 is connected to a lower end of the primary column 2. The piston 4 is sleeved on outer sides of the primary column 2 and the secondary column 3. A lock cover 9 capable of fixing the primary column 2 to the pump chamber 5 is fixed on the pump chamber. An outer side of an upper end of the lock cover 9 is provided with a cover flanging 91 which is turned outwards and then turned downwards to stretch. An upper end of the pump chamber 5 is inserted into and fixed onto an inner side of the cover flanging 91. The lock cover 9 is provided with a locking opening 92 protruding upwards above the cover flanging 91. An outer side of the locking opening 92 is provided with an outer thread 93. An upper end of the primary column 2 is provided with a locking flanging 21 which is turned outwards and then turned downwards to stretch in order to be sleeved on the outer side of the locking opening 92, and an inner side of the locking flanging 21 is provided with an inner thread 22 that is in threaded fit with the outer thread 93.

The pressing head 1 is provided with a socket 16, and an inner side of the primary column 2 is provided with a plug 24 inserted into the socket 16 for plug-in fixation. The socket 16 and the plug 24 are connected in a sealed manner.

The locking flanging 21 has an outer diameter smaller than that of the cover flanging 91. A top plate of the bottle locking cover 8 is provided with a top hole 81 which has a hole diameter smaller than the outer diameter of the cover flanging 91 and through which the cover flanging 91 can pass under the action of external force. The upper part of the pump chamber 5 is provided with an annular baffle 51 which can be blocked beneath the top plate of the bottle locking cover 8 from below and restricts the top plate of the bottle locking cover 8 below the cover flanging 91. A gasket 10 located below the baffle 51 is provided between the pump chamber 5 and the bottle locking cover 8.

In order to facilitate sleeving the bottle locking cover 8 outside the cover flanging 91, the bottle locking cover 8 is provided with an outward-facing chamfer 82 on a lower edge of the top hole 81.

A pump core of the food pump described above is composed of the primary column 2, the secondary column 3, the piston 4, the pump chamber 5, the spring 6, the glass bead 7 and the lock cover 9. The lock cover 9 is fixed on the pump chamber 5 by plugging and fixing the upper end of the pump chamber 5 into the cover flanging 91. The primary column 2 is fixed to the lock cover 9 by a threaded connection of the locking flanging 21 with the locking opening 92. Meanwhile, the secondary column 3, the piston 4, the spring 6 and the glass bead 7 are confined within the pump chamber 5, thus forming a pump core which can be stored and transported independently, so that the pump core, as a standard component, can match different pressing heads 1 and bottle locking covers 8 according to requirements in subsequent production and assembly processes, so as to meet the needs of different customers and use occasions, increase the flexibility of use, and reduce product development and manufacturing cost.

An inner side wall of the cover flanging 91 is provided with a concave annular groove 94. The upper end of the pump chamber 5 is provided with a convex ring 52 which protrudes outwards and is tightly attached to the annular groove 94. There are two pairs, namely an upper pair and a lower pair, of convex rings 52 and annular grooves 94, so that the connection is stable and reliable, and the sealing performance is better.

According to the embodiments shown in FIGS. 1 to 4, in order to prevent the spring 6 from contacting the food material, the lock cover 9 is provided with a spring cavity 95 inserted into the pump chamber 5, and an outer side of the primary column 2 is provided with an outer sleeve 23 located in the spring cavity 95. The spring 6 is arranged inside the outer sleeve 23, with an upper end of the spring 6 pressing against the top of the outer sleeve 23 and a lower end thereof pressing against the bottom of the spring cavity 95. The primary column 2 extends downwards from the bottom of the spring cavity 95. The secondary column 3 and the piston 4 are located below the spring cavity 95. The spring 6 is arranged inside the outer sleeve 23 and located outside an inner passage of the primary column 2, and is positioned above and isolated from a material cavity formed below the secondary column 3 and the piston 4, so that the spring 6 is externally placed, which can avoid contact between the spring 6 and the material when the food material is pumped, and prevent the material from being corroded and contaminated.

Figure 2:
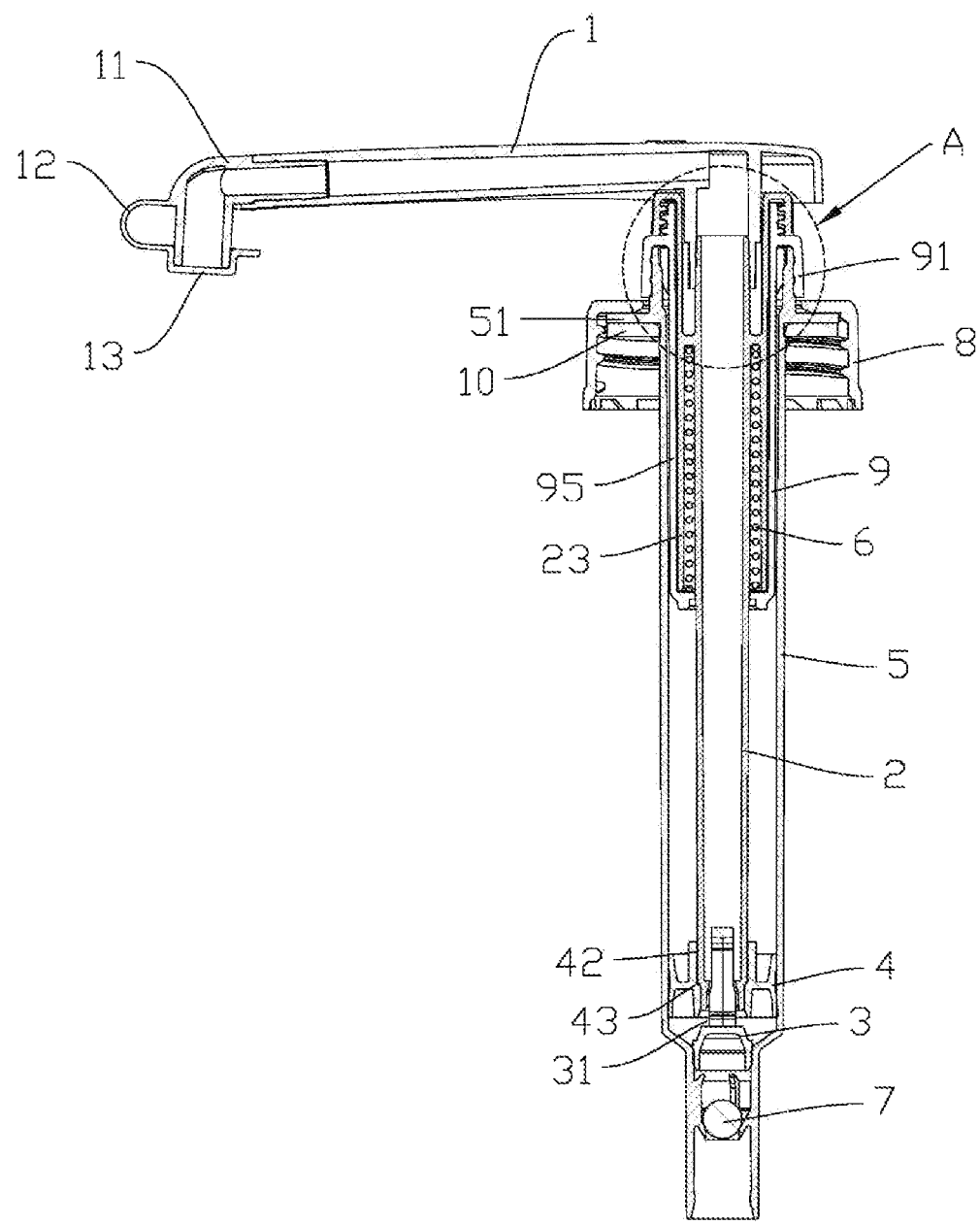
FIG. 2 is a sectional view of the embodiment of FIG. 1.
Figure 3:
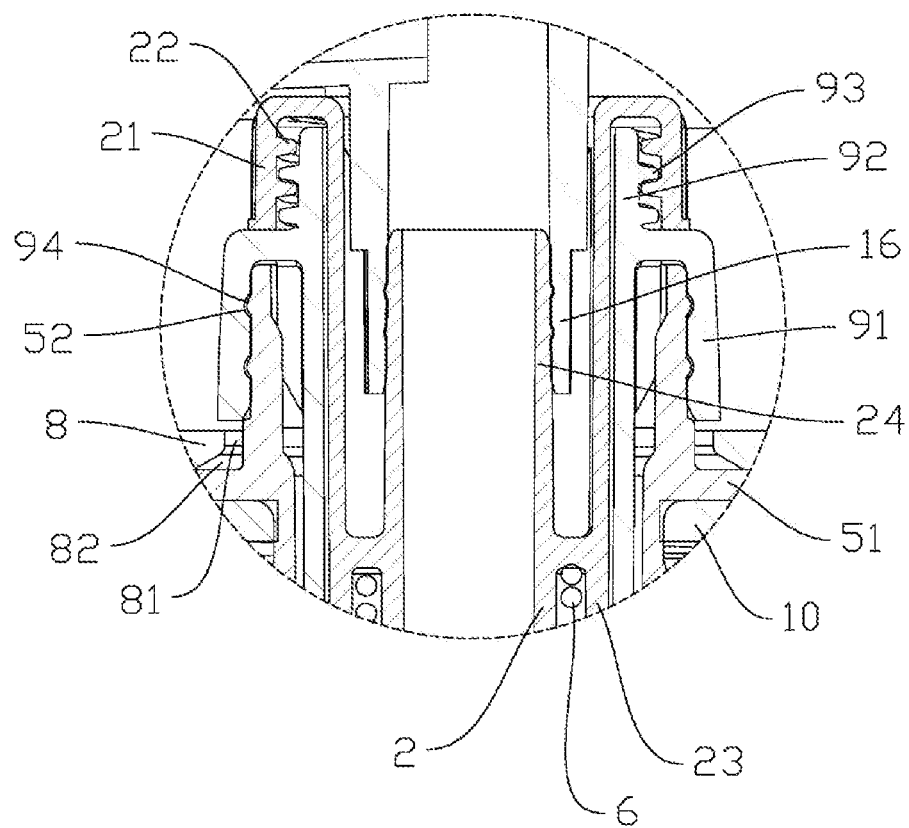
FIG. 3 is a partial enlarged view of part A of FIG. 2.

As shown in FIGS. 1 and 2, the secondary column 3 is fixed to the lower end of the primary column 2. A through hole 31 for liquid to flow into the primary column 2 is reserved between the secondary column 3 and the primary column 2. The lower end of the primary column 2 is inserted into an inner ring 41 of the piston 4. The inner ring 41 of the piston 4 is provided with an annular sealing ridge 42 which protrudes inwards and tightly presses against the outer side of the primary column 2 from the side. A step 43 for the primary column 2 to press against after moving downwards a certain distance relative to the piston 4 is provided at a certain distance below the annular sealing ridge 42. The structure is simple.

In order to prevent mosquitoes, worms, dust and impurities in the air, etc. from entering and then contaminating the material, an outflow head 11 with an outlet facing downwards is connected at an outlet of the pressing head 1, and the outlet of the outflow head 11 is provided with a closing valve which can close the outlet.

As shown in FIGS. 1 and 2, as an embodiment of the closing valve, the closing valve comprises a cover cap 13 which is connected to the outflow head 11 through a flexible strip 12 and can cover the outlet of the outflow head 11. If it is intended to discharge the material by pressing, just remove the cover cap 13, and re-cover the cover cap 13 after taking the material. The structure is simple and the operation is convenient.

Figure 4:
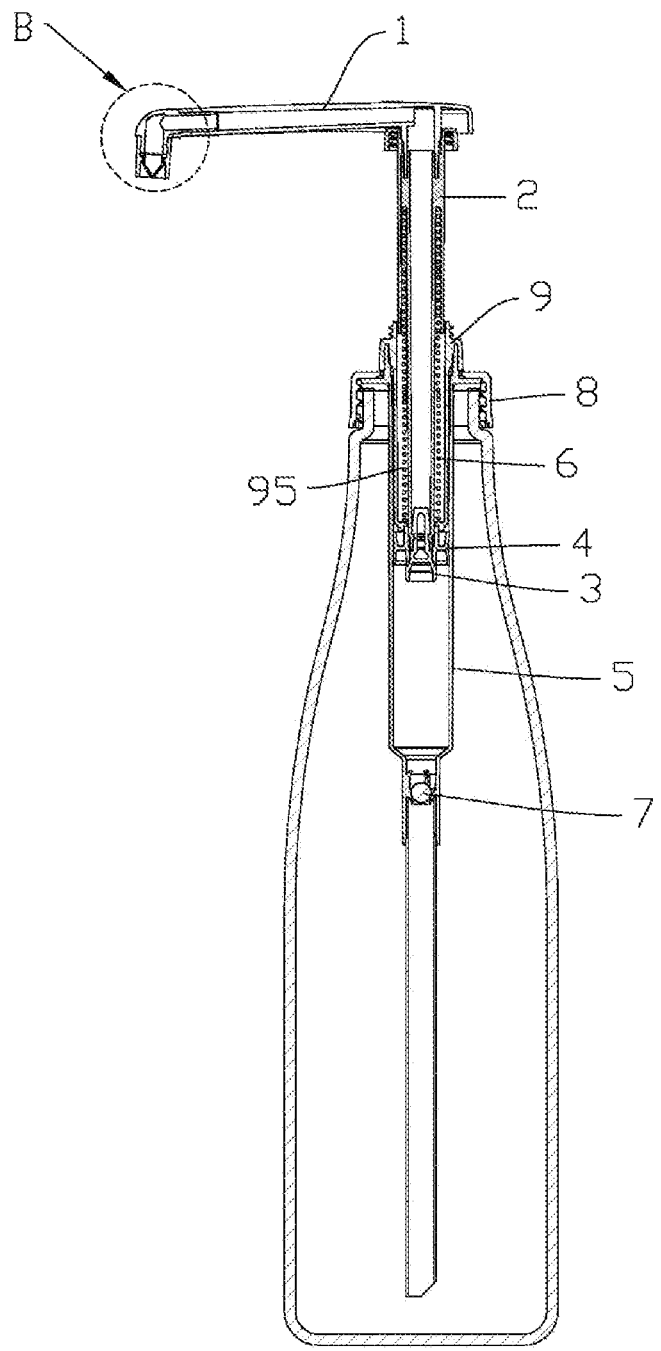
FIG. 4 is a sectional view of an embodiment of the food pump with a safe outlet valve and an outer mounted spring of the utility model after being assembled into a bottle.
Figure 5:
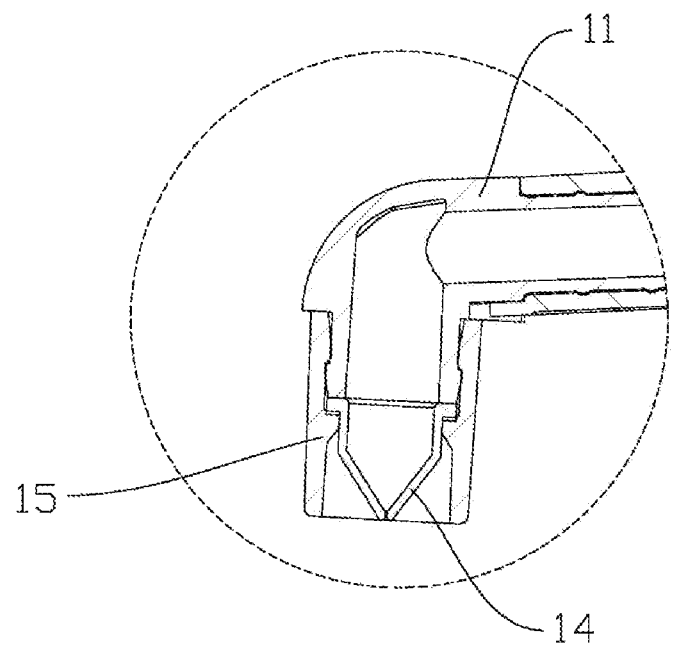
FIG. 5 is a partial enlarged view of part B of FIG. 4.
Figure 6:
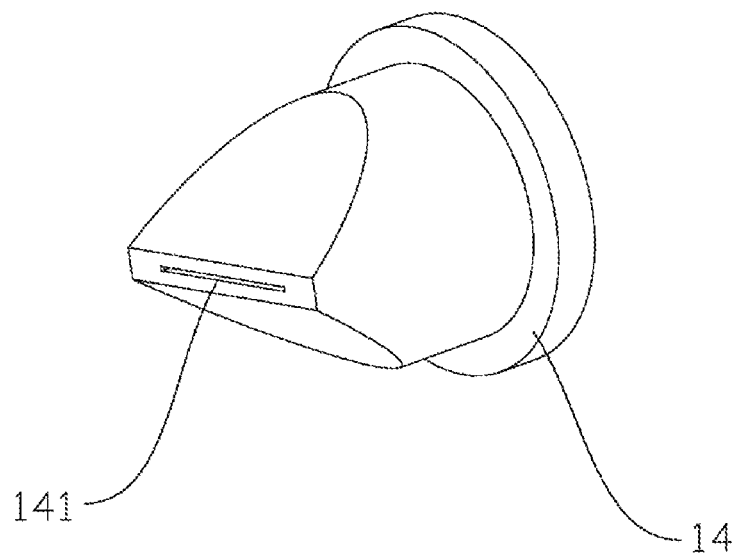
FIG. 6 is a structural schematic view of a duckbill head.

As shown in FIGS. 4 to 6, as an embodiment of the closing valve, the closing valve comprises an elastic duckbill head 14, the closing valve is connected with a fixing sleeve 15 for fixing the duckbill head 14 below the outlet of the outflow head 11. The duckbill head 14 is located inside the fixing sleeve 15, and has a flat mouth 141 that elastically opens when the pressure inside the pressing head 1 increases and elastically returns to close under its own elasticity when the pressure inside the pressing head 1 decreases. When the pressing head 1 is pressed, the food material flows out by breaking through the flat mouth 141 due to its large internal pressure. After the pressing head bounces up, the internal pressure experienced by the flat mouth 141 becomes smaller, and the flat mouth can be closed elastically, thereby realizing automatic opening and closing of the outlet of the outflow head.

What is claimed is:

1. A food pump with a safe outlet valve and an outer mounted spring, comprising a pressing head, a primary column, a secondary column, a piston, a pump chamber, a spring and a bottle locking cover; the pressing head being installed on the primary column; the primary column being arranged within the pump chamber; the secondary column being connected to a lower end of the primary column; the piston being sleeved on outer sides of the primary column and the secondary column; characterized in that a lock cover capable of fixing the primary column to the pump chamber is fixed on the pump chamber; an outer side of an upper end of the lock cover is provided with a cover flanging which is turned outwards and then turned downwards to stretch; an upper end of the pump chamber is inserted into and fixed onto an inner side of the cover flanging; the lock cover is provided with a locking opening protruding upwards above the cover flanging; an outer side of the locking opening is provided with an outer thread; an upper end of the primary column is provided with a locking flanging which is turned outwards and then turned downwards to stretch in order to be sleeved on the outer side of the locking opening; and an inner side of the locking flanging is provided with an inner thread that is in threaded fit with the outer thread.

2. The food pump with a safe outlet valve and an outer mounted spring according to claim 1, characterized in that the locking flanging has an outer diameter smaller than an outer diameter of the cover flanging; and a top plate of the bottle locking cover is provided with a top hole which has a hole diameter smaller than the outer diameter of the cover flanging and through which the cover flanging can pass under an action of external force; an upper part of the pump chamber is provided with an annular baffle which can be blocked beneath the top plate of the bottle locking cover from below and restricts the top plate of the bottle locking cover below the cover flanging; and a gasket located below the baffle is provided between the pump chamber and the bottle locking cover.

3. The food pump with a safe outlet valve and an outer mounted spring according to claim 2, characterized in that the bottle locking cover is provided with an outward-facing chamfer on a lower edge of the top hole.

4. The food pump with a safe outlet valve and an outer mounted spring according to claim 1, characterized in that an inner side wall of the cover flanging is provided with a concave annular groove; the upper end of the pump chamber is provided with a convex ring which protrudes outwards and is tightly attached to the annular groove; and there are two pairs, including an upper pair and a lower pair, of the convex rings and the annular grooves.

5. The food pump with a safe outlet valve and an outer mounted spring according to claim 1, characterized in that the lock cover is provided with a spring cavity inserted into the pump chamber; an outer side of the primary column is provided with an outer sleeve located in the spring cavity; the spring is arranged inside the outer sleeve, and an upper end of the spring is pressed against the top of the outer sleeve and a lower end of the spring is pressed against the bottom of the spring cavity; the primary column protrudes downwards from the bottom of the spring cavity; the secondary column and the piston are located below the spring cavity; and the spring is positioned above and isolated from a material cavity so as to avoid a contact between the spring and a material when the food material is pumped.

6. The food pump with a safe outlet valve and an outer mounted spring according to claim 5, characterized in that the secondary column is fixed to the lower end of the primary column; a through hole for liquid to flow into the primary column is reserved between the secondary column and the primary column; the lower end of the primary column is inserted into an inner ring of the piston; the inner ring of the piston is provided with an annular sealing ridge which protrudes inwards and tightly presses against the outer side of the primary column from the side; and a step for the primary column to press against after moving downwards a certain distance relative to the piston is provided at a certain distance below the annular sealing ridge.

7. The food pump with a safe outlet valve and an outer mounted spring according to claim 1, characterized in that an outflow head with an outlet facing downwards is connected at an outlet of the pressing head, and the outlet of the outflow head is provided with a closing valve which can close the outlet.

8. The food pump with a safe outlet valve and an outer mounted spring according to claim 7, characterized in that the closing valve comprises a cover cap which is connected to the outflow head through a flexible strip and can cover the outlet of the outflow head.

9. The food pump with a safe outlet valve and an outer mounted spring according to claim 7, characterized in that the closing valve comprises an elastic duckbill head, the closing valve is connected with a fixing sleeve for fixing the duckbill head below the outlet of the outflow head, the duckbill head is located inside the fixing sleeve, and has a flat mouth which elastically opens when pressure inside the pressing head increases and elastically returns to close under its own elasticity when the pressure inside the pressing head decreases.

10. The food pump with a safe outlet valve and an outer mounted spring according to claim 1, characterized in that the pressing head is provided with a socket, and an inner side of the primary column is provided with a plug inserted into the socket for plug-in fixation.

* * * * *